(No Model.)

M. W. ILES & F. KEIPER.
MATTE POT FOR SMELTING FURNACES.

No. 335,224. Patented Feb. 2, 1886.

Witnesses:
Geo. W. Miatt
Edwin T. Rice Jr.

Inventors:
Malvern W. Iles
Fredk. Keiper,
By their Attorney,
Willard Parker Butler

United States Patent Office.

MALVERN W. ILES AND FREDRICK KEIPER, OF DENVER, COLORADO; SAID KEIPER ASSIGNOR OF ONE-HALF HIS RIGHT TO SAID ILES.

MATTE-POT FOR SMELTING-FURNACES.

SPECIFICATION forming part of Letters Patent No. 335,224, dated February 2, 1886.

Application filed October 26, 1885. Serial No. 180,935. (No model.)

*To all whom it may concern:*

Be it known that we, MALVERN W. ILES and FREDRICK KEIPER, citizens of the United States, and residents of Denver, in the county of Arapahoe and State of Colorado, have invented certain new and useful Improvements in Matte-Pots for Smelting Furnaces, of which the following is a specification.

Our invention relates to an improved form of matte-pot, which is used in connection with furnaces for smelting silver, lead, copper, and other ores; and the object of the same is to effect a quick, economical, and more perfect separation in smelting of the mattes rich in precious metals from the poor slags than has hitherto been possible.

Heretofore many attempts have been made to interpose a large pot in front of a smelting-furnace for the accumulation of the matte, and to allow the slag to run off therefrom by means of a suitable trough at the top of the pot. Such atttempts have, however, gradually been abandoned, owing to the difficulty experienced in manipulating the pot and to the incompleteness of the separation, as well as to other causes.

When mattes and slags are tapped from a smelting-furnace into a large pot having a suitable discharge-spout at the top, the mattes will settle almost completely to the bottom, and the slags will rise thereon, and as soon as the pot becomes full the slag will begin to flow off through the spout, and for a short and varying interval of time be free from matte.
The slag will, nevertheless, soon commence to carry off with it portions of the matte, owing to the fact that it cools rapidly and forms a crust at the top, which causes the matte to settle incompletely.
To obviate the cooling of the mass and to prevent the formation of the crust, it was sometimes customary to place charcoal or other combustible material upon the top of the matte-pot, which was necessarily both tedious and troublesome.

We have discovered that by means of a peculiar form of cover, hereinafter described, placed upon a particular form of matte-pot we are able to successfully overcome the above-mentioned difficulty, and to obtain in the matte-pot a perfect accumulation of matte and an overflow of slag practically free from matte.

Our invention will be best understood by reference to the accompanying drawings, forming a part of this specification, in which—

Figure 1:
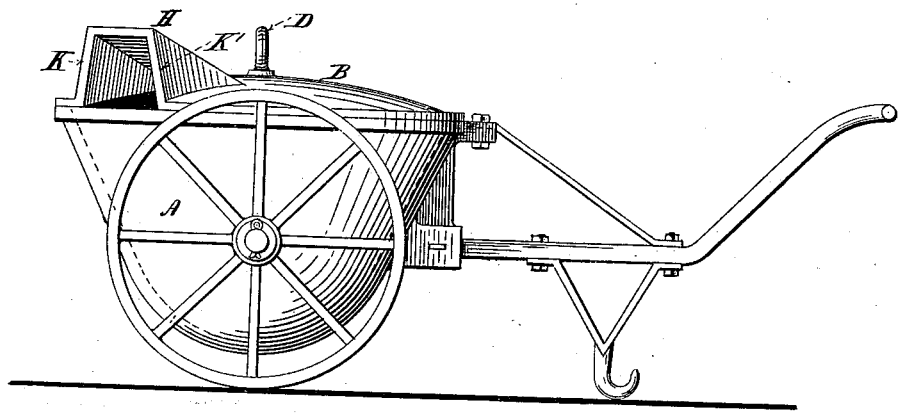
Figure 3:
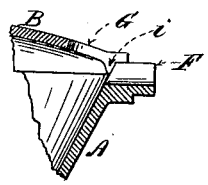
Figure 2:
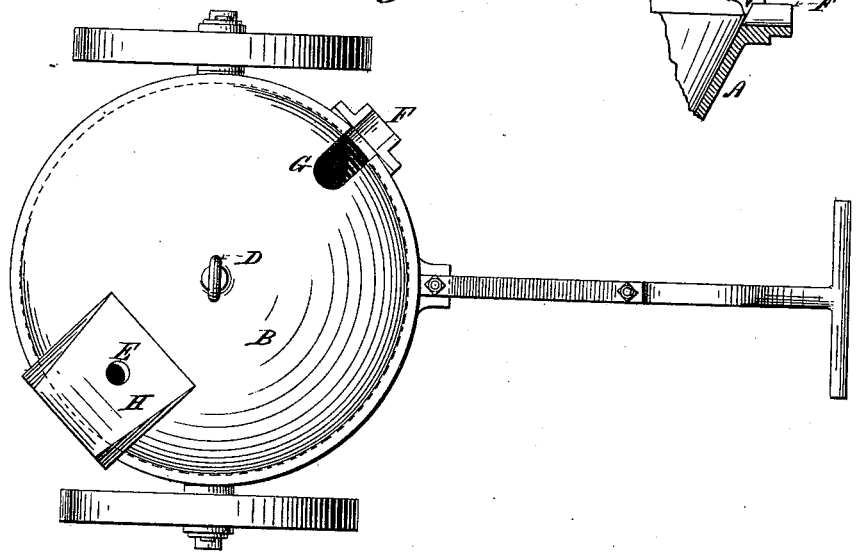

Figure 1 is a vertical section, Fig. 2, a plan view of the matte-pot and cover, and Fig. 3 a sectional view of the discharge-spout.

Similar letters refer to similar parts throughout the several views.

In all three of the views, A represents a large matte-pot, made of cast-iron or of other convenient metal, of the shape shown or of any other shape that will enable it to be conveniently dumped. Its dimensions will vary according to the size of the furnace in connection with which it is used. This pot is mounted upon wheels, as shown in the views, whereby it may be rolled to and from the tap-hole of the furnace at pleasure.

F is a spout for discharging the slags, and may be cast directly upon the pot or be composed of a separate and detachable casting attached in any suitable manner, as may be found most convenient.

The cover B may be made of cast-iron or other suitable metal, and is of the shape shown in the views. The cover is slightly spherical in shape, and is raised at the point H, so that the slags may flow from the tap-hole uninterruptedly into the pot A. The raised portion H is preferably made with flat side walls, K K', which flare slightly inward, as shown.

The object of making the side walls of the raised portion flaring is to prevent the chilled slag from causing the cover to bind, and thereby causing difficulty and delay in working.

The cover is held upon the pot by means of the offset or flange *i*, as shown in the views.
By means of this flange the slag is prevented from issuing through the joint or crack between the cover and the pot, and the slag can be allowed to rise to a point higher than the exit-trough, so that it may come in contact with the slightly spherical cover and there become chilled, forming a crust which serves the purpose of retaining the heat within the pot.

In the raised portion H of the cover is placed an opening, E, as shown in the views, which may be of any convenient form, but preferably either circular, with a diameter from one and one-half to two inches, or elliptical. The object of this opening is to enable a pointed bar to be introduced for breaking the shell-crust as occasion may require.

D is a metal ring screwed or otherwise attached to the top of the cover, for the purpose of enabling it to be easily removed.

G is a semicircular nick or cut in the edge of the cover B, for the purpose of opening or closing the spout F. When placed upon the pot, the cover is so turned that the cut G shall come directly over the spout.

The method of operation of the pot is as follows: The pot is first coated or washed with a solution of lime-water, and the cover B placed upon it, as shown, and the pot is then run up to the furnace, where the spout of the tap-hole fits tightly into the raised part of the cover H. All joints are then carefully closed with a fragment of clay, and the furnace allowed to run until the pot is full. As soon as the slag begins to flow through the spout F, the flow at the spout and at the furnace is cut off. A small slag-buggy of the ordinary character is then run up to the spout F, and the tapping into it commenced by breaking the crust through the slot or opening G. As soon as the slag begins to run into the pot, the crust is broken through the opening E, and the tap-hole of the furnace opened. The slag and mattes thereupon commence to run into the pot, and as fast as one slag-buggy is filled it is wheeled away and a fresh one run up. When the furnace comes to a blow, or when the large pot gets full of matte, the tap-hole is closed by means of a plug of clay, and the pot removed. The level of the slag in the matte-pot gradually rises until it chills upon the under side of the cover, thereby retaining the heat in the matte-pot to a marked degree. The tapping into the matte-pot is continued until the upper surface of the matte is from four to six inches below the rim of the pot, which, however, can only be ascertained by practice. Thus, for example, in practice, twenty-five buggies full of useless slag are drawn off from the matte-pot, and the last five of these are saved. If matte is found in the twenty-third or twenty-fourth buggy, at least twenty buggies full can be thrown away. If, however, no matte is found in the twenty-fifth pot, the number of buggies that can be run at one tapping can be safely increased. By an examination of the contents of the first few series of small slag-pots which are tapped from the matte-pot it is possible to ascertain the number of tappings that can be made with safety through the pot. When full, the contents of the matte-pot may be drawn off by breaking a hole in the solidified crust at or near the rim of the pot, and allowing the matte in the center of the mass to flow off into a series of small pots placed upon a lower level, leaving the crust or shell in the pot. When such portions of the slag as are still liquid begin to run, the pouring should be stopped.

The advantages of our apparatus are as follows: By means of it a large amount of hand-labor in separation and transportation is saved, the mattes are concentrated into one large vessel and handling in small slag-buggies is avoided, the danger of the mattes mixing with the slag caused by collecting the mattes from a large number of small pots is avoided, especially where the percentage of copper in the mattes increases, and where sulphide of zinc is present in the slag, and a small portion only of the material tapped from the furnace has to be treated over again—namely, the contents of the matte-pot and of the last few buggies.

We claim as our invention—

1. The combination, with a matte-pot having a discharge-spout at its upper rim, of a dome-shaped cover fitting tightly over said pot, and a horizontal opening in said cover, substantially as described, into which the discharge-spout of the furnace fits closely.

2. The combination, with the matte-pot A, having a discharge-spout, F, at its upper rim, of the dome-shaped cover B, fitting tightly over said pot, the flat portion H, with the beveled side walls, K K', forming a horizontal opening in said cover, fitting over the discharge-spout of the furnace, the poke-hole E in the flat surface of said cover, and the opening G over the spout F, for opening and closing said discharge-spout.

3. In a matte-pot, the combination, with the cover B, of the poke-hole E, whereby access is obtained to the interior of the matte-pot.

4. The combination, substantially as hereinbefore described, with the matte-pot A, provided with a discharge-spout, F, at its upper rim, of the dome-shaped cover B and the slot or opening G at the edge of said cover and over said discharge-spout, whereby the same may be opened and closed at pleasure.

5. The combination, substantially as hereinbefore described, with the matte-pot A, having a discharge-spout, F, at its upper rim, whereby its contents may be drawn off, of the dome-shaped cover B, with the interior flange, I, fitting tightly over said pot, the flat surface H, with the beveled side walls, K K', forming a horizontal opening in said cover and fitting over the discharge-spout of the furnace, the poke-hole E in the flat surface of said cover, and the opening G over the spout F, for opening and closing said discharge-spout.

Signed at Denver, in the county of Arapahoe and State of Colorado, this 7th day of October, A. D. 1885.

MALVERN W. ILES.
FREDRICK KEIPER.

Witnesses:
EDUARD RALLAUDET,
M. P. COCHRANE.